(12) United States Patent
Gueret

(10) Patent No.: US 7,156,105 B2
(45) Date of Patent: Jan. 2, 2007

(54) APPLICATOR, DEVICE, AND METHOD

(75) Inventor: Jean-Louis H. Gueret, Paris (FR)

(73) Assignee: L'Oreal, Paris (FR)

( * ) Notice: Subject to any disclaimer, the term of this patent is extended or adjusted under 35 U.S.C. 154(b) by 0 days.

(21) Appl. No.: 09/860,601

(22) Filed: May 21, 2001

(65) Prior Publication Data

US 2002/0011251 A1    Jan. 31, 2002

(30) Foreign Application Priority Data

May 19, 2000  (FR)  .................................. 00 06442

(51) Int. Cl.
A45D 40/26  (2006.01)

(52) U.S. Cl. .................................................. 132/218

(58) Field of Classification Search ............... 132/200, 132/218, 120, 320, 313, 317, 308; 15/159.1, 15/160, 167.1, 167.2, 195; 401/122, 127, 401/129; D4/105, 106, 110, 134
See application file for complete search history.

(56) References Cited

U.S. PATENT DOCUMENTS

| | | | | |
|---|---|---|---|---|
| 551,994 A | * | 12/1895 | O'Keeffe | 15/195 |
| 1,077,071 A | * | 10/1913 | Holtzman | 15/176.5 |
| D46,650 S | * | 11/1914 | Lavenson | 292/244 |
| 1,370,343 A | * | 3/1921 | Montgomery | 15/195 |
| 2,011,072 A | * | 8/1935 | Nagl | 15/143.1 |
| 2,244,615 A | * | 6/1941 | Garcin | 15/167.2 |
| 2,263,475 A | * | 11/1941 | Strauch | 132/120 |
| 2,454,995 A | * | 11/1948 | Curran | 132/308 |
| 2,599,191 A | * | 6/1952 | Meunier | 15/167.1 |
| 3,662,769 A | * | 5/1972 | Vasas et al. | 401/122 |
| 3,818,534 A | * | 6/1974 | Boucherie | 15/195 |
| 3,843,990 A | * | 10/1974 | Lardenois | 15/159.1 |
| 3,857,134 A | * | 12/1974 | Wells | 15/199 |
| 3,864,781 A | * | 2/1975 | Leonard | 15/159 |
| 3,921,650 A | * | 11/1975 | Montgomery | 132/218 |
| 4,144,611 A | * | 3/1979 | Brown | 15/192 |
| 4,211,217 A | * | 7/1980 | Gueret | 128/67 |
| 4,403,624 A | | 9/1983 | Montgomery | |
| 4,517,701 A | * | 5/1985 | Stanford, Jr. | 15/106 |
| 4,662,385 A | * | 5/1987 | Schefer | 132/218 |
| 4,756,044 A | * | 7/1988 | Clark | 15/182 |
| 4,804,004 A | | 2/1989 | Taylor | |
| 5,020,551 A | * | 6/1991 | Guerret | 132/200 |
| 5,086,793 A | | 2/1992 | Kingsford | |
| 5,137,038 A | * | 8/1992 | Kingsford | 132/218 |
| 5,238,011 A | * | 8/1993 | Gueret | 132/218 |
| 5,325,560 A | * | 7/1994 | Pavone et al. | 15/106 |
| 5,490,737 A | * | 2/1996 | Gueret | 401/122 |
| 5,556,214 A | * | 9/1996 | Ascolese | 401/126 |

(Continued)

FOREIGN PATENT DOCUMENTS

EP    0 237 360    9/1987

(Continued)

*Primary Examiner*—Eduardo C. Robert
*Assistant Examiner*—David Comstock
(74) *Attorney, Agent, or Firm*—Finnegan Henderson Farabow Garrett & Dunner, L.L.P.

(57) ABSTRACT

An applicator for applying a product to hair may include a support not including a twisted wire and at least one through hole extending through the support. The at least one through hole may have a non-constant cross-section. The applicator may also include a tuft of bristles held in the at least one through hole. The tuft of bristles may be configured to apply the product to hair.

122 Claims, 4 Drawing Sheets

U.S. PATENT DOCUMENTS

| | | | |
|---|---|---|---|
| 5,622,411 A | 4/1997 | Weihrauch | |
| 5,687,446 A * | 11/1997 | Chen et al. | 15/195 |
| 5,765,573 A * | 6/1998 | Gueret | 132/218 |
| 5,862,812 A * | 1/1999 | Dumler | 132/218 |
| 5,865,556 A * | 2/1999 | Lhuisset | 401/290 |
| 5,873,669 A * | 2/1999 | Poore et al. | 401/122 |
| 5,902,063 A * | 5/1999 | Lhuisset et al. | 401/122 |
| 5,961,238 A * | 10/1999 | de Bruin et al. | 401/122 |
| 6,029,676 A * | 2/2000 | Dumler | 132/218 |
| 6,220,254 B1 * | 4/2001 | Gueret | 132/313 |
| 6,227,737 B1 * | 5/2001 | Lightfoot | 401/129 |
| 6,280,112 B1 * | 8/2001 | Vieu | 401/122 |

FOREIGN PATENT DOCUMENTS

| | | |
|---|---|---|
| EP | 0 472 875 | 3/1992 |
| FR | 726 157 | 5/1932 |
| JP | 18-9181 | 8/1943 |
| JP | 50-14465 | 5/1975 |
| JP | 59-48320 | 3/1984 |
| JP | 61-193604 | 8/1986 |
| JP | 62-13413 | 1/1987 |
| JP | 63-8810 | 1/1988 |
| JP | 1-501366 | 5/1989 |
| JP | 4-226610 | 8/1992 |
| WO | WO 88/03376 | 5/1988 |

* cited by examiner

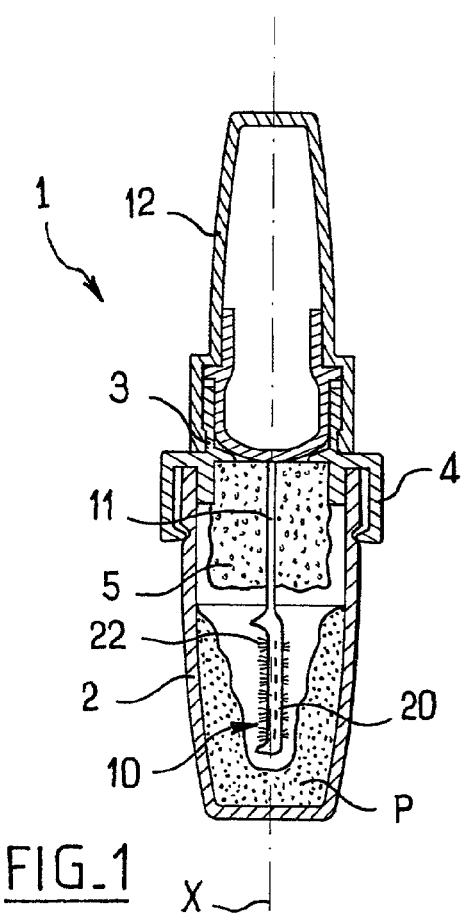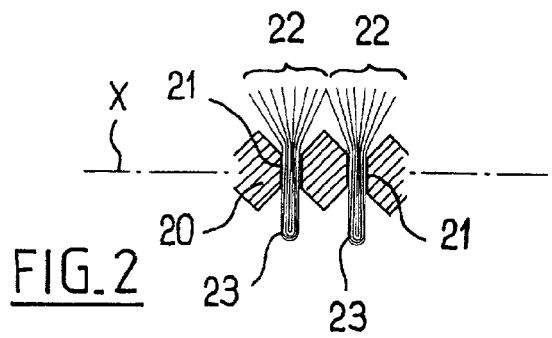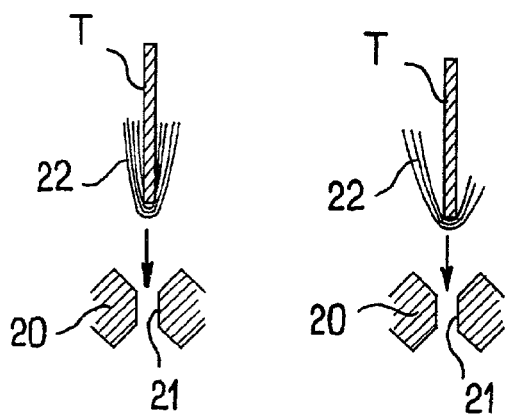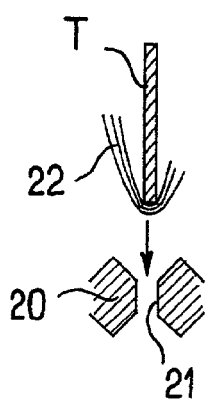
FIG_1  FIG_2  FIG_3  FIG_4
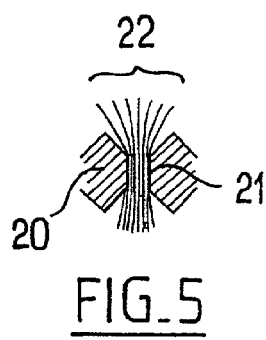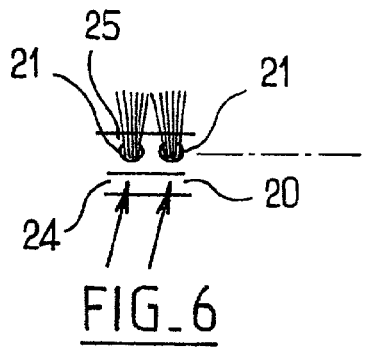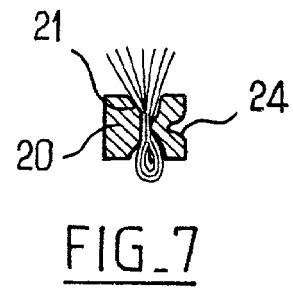
FIG_5  FIG_6  FIG_7
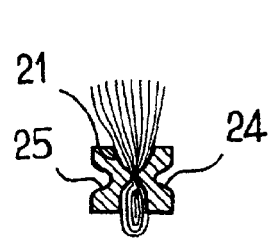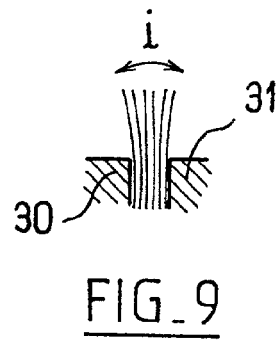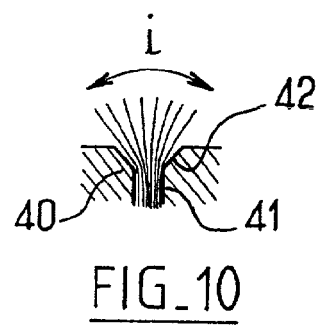
FIG_8  FIG_9  FIG_10

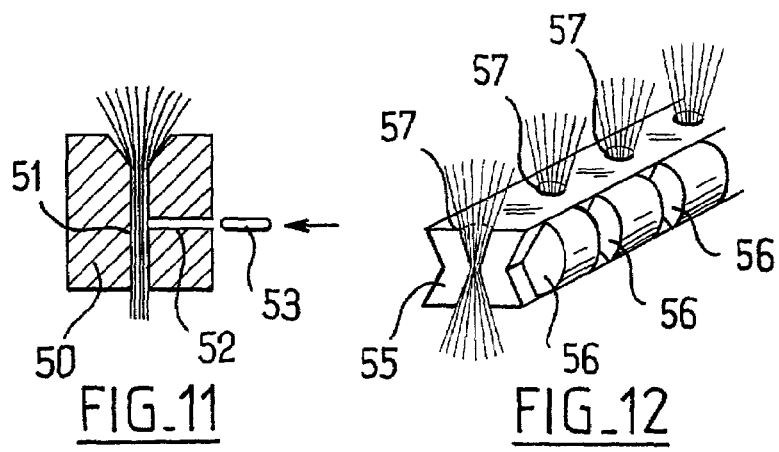
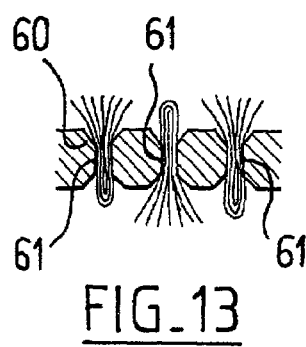
FIG_11  FIG_12  FIG_13
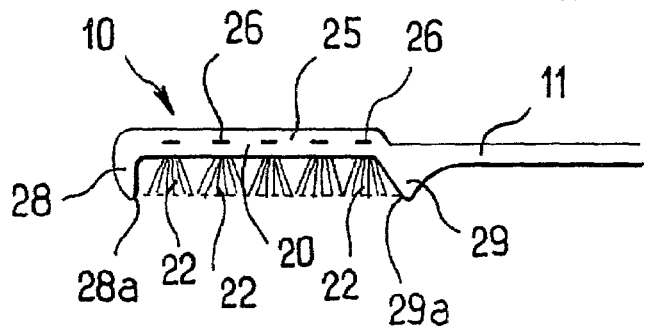
FIG_14
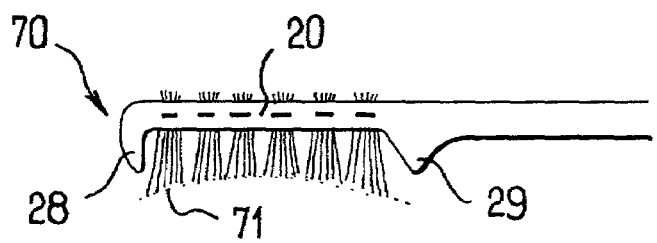
FIG_15
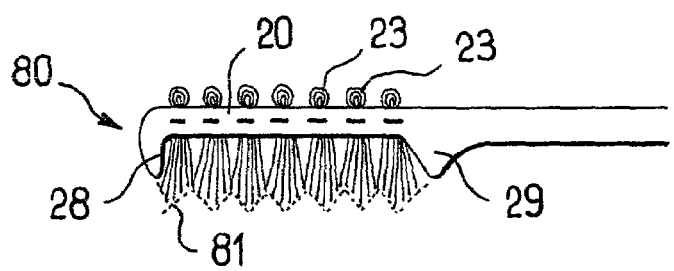
FIG_16
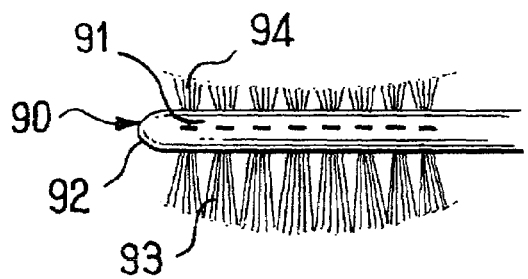
FIG_17

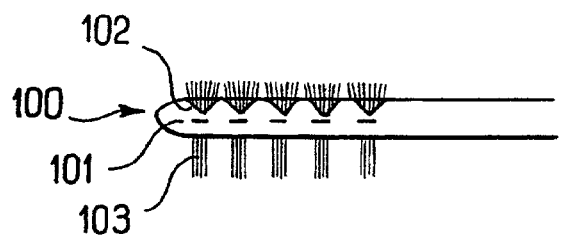
FIG_18
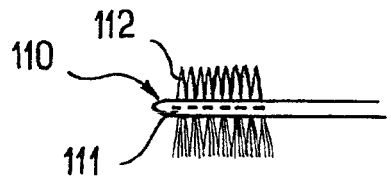
FIG_19
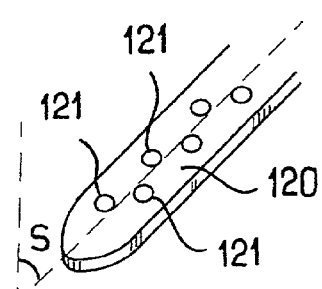
FIG_20
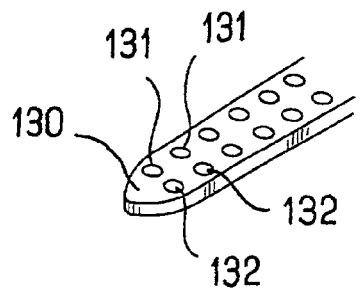
FIG_21
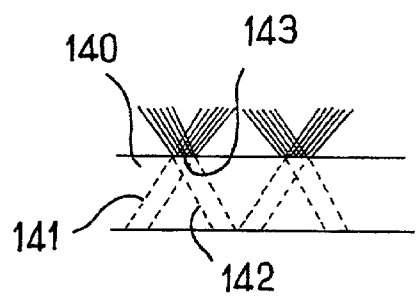
FIG_22
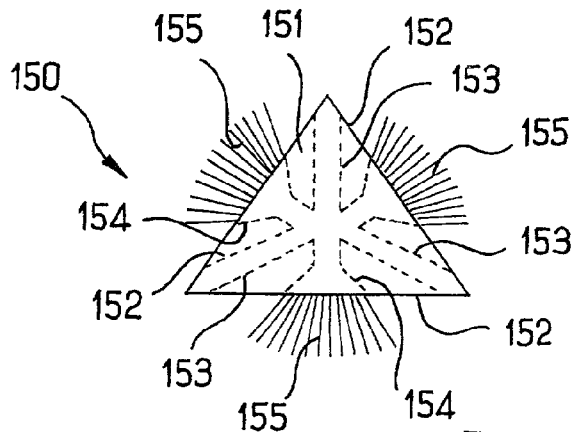
FIG_23
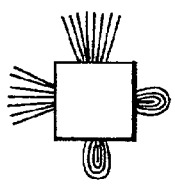
FIG_24
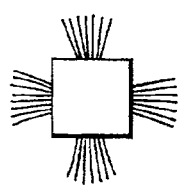
FIG_25
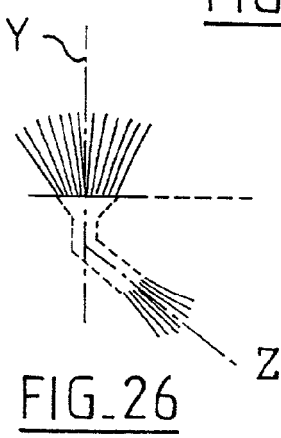
FIG_26

APPLICATOR, DEVICE, AND METHOD

The present invention relates to an applicator and a method for applying a product to keratinous fibers (e.g., hairs), such as the eyelashes or the eyebrows. More particularly, an aspect of the invention relates to applying a cosmetic or a care product, such as mascara, to hairs. The invention also relates to a device for packaging and applying a product to hair, and a method of manufacturing an applicator.

Mascara is conventionally applied to hair such as the eyelashes or the eyebrows by means of a brush made up of bristles secured to a twisted wire core. There exists a need for an applicator offering a wider range of options in how the bristles are secured to the applicator and in the makeup effects than can be obtained from an applicator having bristles secured to a twisted wire core.

In accordance with the purpose of the invention, as embodied and broadly described herein, the invention includes an applicator for applying a product to hair. The applicator may comprise a support not including a twisted wire and at least one through hole extending through the support. The at least one through hole may have a non-constant cross-section. The applicator also comprises a tuft of bristles held in the at least one through hole. The tuft of bristles may be configured to apply the product to hair.

In an embodiment, the at least one through hole comprises two ends with each end being on an external face of the support.

The applicator may be sized for application of the product to one of eyelashes and eyebrows.

The support may be substantially straight along at least a portion including the at least one through hole.

In another embodiment, the at least one through hole may comprise a plurality of through holes, wherein each through hole receives a respective tuft of bristles. To hold the tuft of bristles in the through hole, the at least one through hole may be deformed by plastically deforming the support after the tuft of bristles is inserted in the at least one hole. When the at least one through hole is deformed, a portion of the at least one through hole may have a reduced cross-section resulting from the deformation. The portion of reduced cross-section may hold the bristles in the at least one through hole. The at least one through hole may be deformed, for example, by one of forming, seaming, heat-sealing, and stamping of the support.

In an additional embodiment, the applicator may comprise a fastener holding the tuft of bristles in the at least one through hole. The fastener may extend in a direction substantially perpendicular to an axis of the tuft of bristles. The applicator may further comprise a secondary hole associated with the at least one through hole. The secondary hole may intersect with the through hole and the fastener may be at least partially in the secondary hole. Optionally an axis of the secondary hole may be substantially perpendicular to an axis of the at least one through hole. In an embodiment, the fastener may be a peg.

The cross-section of the at least one through hole could be one of square, oblong, and non-circular at some position between ends of the at least one through hole. The at least one through hole may comprise a countersink adjacent to an end thereof.

In the embodiment having a plurality of through holes, the plurality of through holes may comprise at least one row of through holes. The at least one row of through holes may be disposed in a staggered configuration or a straight configuration. At least some of the plurality of through holes may intercommunicate with one another.

In still another embodiment, the plurality of through holes may include a first through hole having a first axis and a second through hole having a second axis. The first and second axes may not be parallel to one another. The tufts of bristles in the first and second through holes may form a V-shape extending from the support when the applicator is viewed from a side. The first and second axes could cross one another when the axes are projected in a plane and/or the first and second through holes could intersect one another. When the first and second through holes intersect one another, the tuft of bristle in the first through hole may contact the tuft of bristles in the second through hole. For example, the tufts of bristles in the first and second through holes may contact one another and thereby contribute to holding one another in the respective through holes. The first and second through holes could open onto an external face of the support via a common orifice. A centerline of the at least one through hole between ends of the at least one through hole may not be substantially straight.

In an embodiment, the support may have a flat shape. The support could be elongate in shape and of polygonal cross-section. For example, the support could have a triangular cross-section. When the support is elongate in shape, the support may comprise at least one of a portion having teeth, a portion having notches, a portion in relief, and a portion having roughnesses, the portion being configured to at least one of enable hairs to be combed or smoothed and provide reserves of product. The portion may extend, for example, transversely to a longitudinal axis of the support. The support could be a single piece or the support could be a composite structure. For example, the support may comprise a core sandwiched between a top portion and a bottom portion, wherein the top and bottom portions are made of materials different than the core.

In yet another embodiment, the applicator may further comprise a wand on the support. The wand and/or the support may be not hollow. The wand and the support could be a single piece of unitary construction.

In an embodiment, at least some of the bristles may comprise at least one of grooves, folds, forks, and rounded heads. At least some of the bristles could be flat.

In still another embodiment, at least some of the bristles may form loops adjacent to an end of the at least one through hole. At least some of the bristles may be cropped at an end of the at least one through hole.

Bristles of the tuft of bristles may project from the first and second ends of the at least one through hole to respective heights that are either substantially identical to one another or different from one another.

The tufts of bristles may form a brush having a profile of at least one of concave, convex, and saw-tooth. The tuft of bristles may comprise bristles having at least one of different diameters and different cross-sections.

When the plurality of through holes comprises a first through hole and a second through hole, the tuft of bristles corresponding to the first through hole may comprise bristles having one of a diameter and cross-section different from the tuft of bristles corresponding to the second through hole.

In another embodiment, an applicator may comprise a support not including a twisted wire and at least one through hole extending through the support. The at least one through hole may have first and second ends on external faces of the support. The applicator may also include a tuft of bristles held in the at least one through hole. The tuft of bristles may be configured to apply the product to the hair.

In yet another embodiment, an applicator may comprise a support not including a twisted wire and being non-hollow, and at least one through hole extending through the support. The applicator may also include a tuft of bristles held in the at least one through hole. The tuft of bristles may be configured to apply the product to the hair.

In a further embodiment, an applicator may comprise a support not including a twisted wire and a wand on an end of the support. The wand may be non-hollow. The applicator may also include at least one through hole extending through the support and a tuft of bristles held in the at least one through hole. The tuft of bristles may be configured to apply the product to the hair.

In an additional embodiment, an applicator may comprise a support formed of a plastic material and at least one through hole extending through the support. The at least one through hole may have first and second ends on external faces of the support. The applicator may also include a tuft of bristles held in the at least one through hole. The tuft of bristles may be configured to apply the product to the hair.

In another aspect, the invention may include a device for packaging and applying a product to hair. The device may comprise one of the applicators described above and a receptacle for containing a supply of product. The receptacle may be configured to removably receive the applicator. Optionally, the device may further comprise a wiper member configured to enable wiping of the applicator. The wiper may be configured to enable wiping of the applicator when the applicator is removed from the receptacle. The wiper member may include at least one of a foam and an elastomer.

The applicator of the device may comprise a wand having first and second ends, wherein the first end of the wand is on the support. The wand may optionally comprise a portion of reduced cross-section at a position substantially level with the wiper member when the applicator is in the receptacle. The support may be made of a material that is more flexible than a material used to make the wand.

In an embodiment, the device may further comprise a handle member on the second end of the wand. The handle member may be configured to provide a cap for closing an opening of the receptacle.

In another embodiment, at least some of the bristles are made out of the same material as the support. The bristles may be made, for example, by extruding a soft elastomer material. Optionally, the bristles may be made of a material comprising a gliding agent to facilitate gliding of the bristles along hair. For example, the gliding agent may be chosen from graphite, polytetrafluoroethylene and derivatives thereof, silicones and derivatives thereof, and molybdenum disulfide.

The support could be made of at least one material chosen from polyethylene, polypropylene, polystyrene, polycarbonate, polyamide, polyacetate, polyurethane, polyester, and thermoplastic elastomers.

The tuft of bristles may comprise from about 2 to about 250 bristles or from about 4 to about 100 bristles or from about 5 to about 50 bristles.

In still another embodiment, the device may comprise a hair product contained in the receptacle.

In an additional aspect, the invention may include a method of manufacturing an applicator for applying a product to hair. The method may comprise providing a support. The support may comprise a plurality of through holes extending through the support. The method may further include inserting a tuft of bristles in each of the through holes and fixing the tuft of bristles in each of the through holes so as to retain the tuft of bristles therein. For example, the fixing may include deforming each of the through holes so as to retain the tuft of bristles therein.

Alternatively, the support may comprise a secondary hole associated with each of the through holes that intersects with the through hole, and the fixing may comprise inserting a fastener (e.g., peg) in the secondary hole so as to retain the tuft of bristles in the through hole. Optionally, an axis of the secondary hole may be substantially perpendicular to an axis of the through hole, and the fixing may comprise inserting a peg in the secondary hole.

In an embodiment, the inserting of the tuft of bristles may comprise inserting the tuft of bristles so that the bristles extend from an external face of the support at first and second ends of the through hole.

In another embodiment, the method may further comprise folding each tuft of bristles into a U-shape prior to inserting the tuft of bristles in the corresponding through hole so that each of the bristles has a pair of free ends and a looped portion. The folding may comprise folding the bristles in a location other than a middle thereof. Optionally, the method may further comprise cropping the looped portion to provide an additional pair of free ends.

When the fixing includes deforming, the deforming of each of the through holes may comprise deforming the support on at least one side of each through hole. For example, the deforming of each of the through holes may comprise deforming the support on opposing sides of each through hole by applying a pressure to the support on at least one side of each through hole in a direction substantially perpendicular to an axis of the through hole.

In another embodiment, the method may comprise shearing the bristles so as to give them a particular overall shape. The method may optionally include machining at least one of the free ends and the looped portions of the bristles when the bristles are folded. Optionally, the method may include carding ends of the bristles so as to burst the ends.

In still another embodiment, the method may comprise cutting the tufts of bristles to a desired length prior to inserting the tufts of bristles in the through holes of the support, and not again cutting the tufts of bristles after inserting the tufts of bristles in the through holes of the support.

The method could optionally include coupling a wand to the support by at least one of heat-sealing and deforming of the wand.

In still another embodiment, the method of manufacturing an applicator may comprise providing a support not including a twisted wire, wherein the support comprises a plurality of through holes extending through the support and a plurality of secondary holes corresponding to the through holes. Each secondary hole may have an axis substantially perpendicular to the corresponding through hole. The method may also include inserting a tuft of bristles in each of the through holes and inserting a fastener in each of the secondary holes so as to retain the tuft of bristles in the corresponding through hole.

In still another aspect, the invention may include a method of applying a product to hair. The method may comprise providing the device and the receptacle containing a supply of a hair product. The method may further include loading the applicator with the product and applying the product to the hair by moving the applicator along the hair.

When the product is mascara, the applying may comprise applying the mascara to eyelashes by moving the applicator along the eyelashes.

The loading may include placing the applicator at least partially in the receptacle and contacting the applicator with the product in the receptacle.

When the device includes a wiping member, the method may include wiping the applicator on the wiping member. In the embodiment including a receptacle configured to removably receive the applicator, the applicator may be inserted in the receptacle to load the product and wiped on the wiping member when removing the applicator from the receptacle.

The present invention provides a novel applicator for applying substance, for example, to the eyelashes or the eyebrows. The applicator may comprise a support and bristles secured to the support to apply the substance and may be characterized by the fact that the support is not twisted and includes at least one through hole in which a tuft of bristles is held.

The at least one through hole can have ends opening out on two external faces of the support.

The at least one through hole can be of non-constant cross-section.

The invention may offer new options for implanting the bristles on a support. By choosing the shape given to each hole and the location of each hole on the support, it may be possible to obtain makeup effects that may be difficult if not impossible to obtain easily by means of a conventional brush having a twisted core.

A tuft of bristles corresponding to a given hole may be held therein by deforming the hole after the bristles have been inserted, by subjecting the material of the support to plastic deformation. Such deformation may be obtained by forming the support, either by hot-forming or by cold-forming. The process of forming the support includes deforming the support with a tool, such as a punch. In a variant, the deformation that enables the bristles to be retained may be obtained by seaming, heat-sealing, or stamping the support.

It is possible to make all or some of the holes so that they are countersunk at one or both ends. Such countersinking may enable the bristles to take up a flared configuration where they project from the support.

The dispositions of the holes on the support may be selected as a function of the desired makeup effect, the nature of the bristles used, and the shape of the support.

The through holes can be of a cross-section that is at some position of their length circular or non-circular, such as square or oblong.

The bristles of a tuft can be held in the corresponding hole of the support by fixing means extending perpendicularly to the axis of the hole.

The support can have at least one blind or secondary hole associated with a through hole and substantially perpendicular thereto. The through hole can be of constant cross-section except for the blind hole. Under such circumstances, the above-mentioned fixing means may include a fastener (e.g., peg) inserted in such a blind hole until it bears against the bristles.

In a particular embodiment, the support has at least one row of holes, such a row comprising a succession of holes that are optionally in alignment. By way of example, the holes can thus be disposed in a staggered configuration on one face of the support. The support may have holes of different shapes. The holes can be located in the support at spacing that is regular or otherwise.

The support can also have holes that are in communication with one another, e.g., holes that cross or holes that are united via an open portion of the support. When the holes cross, the bristles of a tuft engaged in one of the holes can contribute to holding the bristles of the tuft engaged in the other hole.

The support can have holes that are not rectilinear. The support can also have holes with axes that are not parallel, but that extend perpendicularly to the longitudinal direction of the support or at a non-zero acute angle relative thereto.

The support can be flat or some other shape, such as one having a constant polygonal cross-section, varying polygonal cross-section, or other cross-section. The support can thus present a general shape in the form of a cone or a pyramid.

The support can be made with teeth, notches, or other portions in relief or roughnesses so as to enable it to comb or smooth hairs or so as to enable it to hold a supply of the substance. In an embodiment, said notches or other portions in relief or roughnesses can extend transversely relative to the longitudinal axis of the support.

The support can be made as a single piece or it can be of composite structure, e.g., a sandwich structure, thus making it possible for a core of the support to be made out of a material that can be selected so as to be relatively easy to form, while the remainder of the support can be made of a material that lends itself easily to making a shape that is predetermined for reasons of appearance, for example, or to make it easier to assemble to the end of the applicator wand.

All kinds of bristles can be fixed to the support. They can be natural or synthetic, e.g., being made of soft elastomer or as a mixture of bristles.

The bristles can be hollow and/or present grooves and/or folds and/or forks, or they can have rounded heads. The bristles can be flat.

The applicator can have at least one hole with a tuft of bristles projecting from each end of the hole to heights that are identical or different, depending on the kind of applicator that is to be made. Within each hole, the bristles can be of different diameters, natures, and/or sections.

A tuft can also have bristles of diameter(s), nature(s), and/or section(s) that are different from those of the bristles in another tuft.

All or some of the bristles can be made out of the same material as the support, e.g., to make it easier to fix the bristles to the support by melting the material. The bristles can be made by extruding a soft elastomer material.

The bristles can be made of a material containing a filler for improving sliding in contact with hairs, the filler being selected in particular from: graphite, polytetrafluoroethylene and derivatives thereof, silicones and derivatives thereof, and molybdenum disulfide.

The support can be made out of one or more materials selected from the following list: polyethylene, polypropylene, polystyrene, polycarbonate, polyamide, polyacetate, polyurethane, polyester, and thermoplastic elastomers.

The support can be a non-hollow support.

The number of bristles per tuft can optionally lie in the range of about 2 to about 250, about 4 to about 100, or about 5 to about 50.

All or some of the bristles can form loops on one side of the corresponding hole, or they can be cropped.

The bristles can be subjected to machining after they have been put into place on the support so as to form a brush having a determined profile which can be concave, convex, saw-tooth, etc.

The invention also provides a device for packaging and applying substance to hairs, for example, the eyelashes or the eyebrows. The device may comprise an applicator, as described, a receptacle for containing a supply of substance, and a wiper member enabling the applicator to be wiped as it leaves the receptacle.

The support can be fixed to one end of a wand and a handle member may be on the other end of the wand. The handle member may also constitute a closure cap for the receptacle.

The above-mentioned wand can be made using sealing means enabling the receptacle to be closed in leakproof manner.

The support can be made of a material that is more flexible or more rigid than the material used for manufacturing the wand to which it is fixed. The support can also be made integrally with the wand. The wand can be a non-hollow wand. The support can be made of thermoplastic or vulcanized elastomer.

The invention also provides a method of manufacturing an applicator for applying a substance to the eyelashes or other hairs, the method may comprise the following:

making or providing an elongate non-twisted support having through holes;

inserting tufts of bristles in the through holes; and deforming the holes of the support so as to retain each tuft of bristles in the corresponding hole.

Optionally, the bristles may be folded into a U-shape prior to being inserted in the through holes, thus facilitating insertion therein. The bristles then form loops at the ends of the holes opposite from their insertion ends, which loops can be left on the applicator or they can be cropped. The bristles need not be folded in half when they are installed in the support holes.

If so desired, it is thus possible to obtain very short loops on one side of the support.

The bristles can be sheared to give them a particular overall shape. The free ends of the bristles or of the loops can be machined. The bristles can also be carded so as to burst their ends.

The support can be heat-sealed or fixed by deforming the material on a wand.

The bristles can be cut to a desired length prior to being installed on the support and need not be cut again thereafter.

The support can be deformed by being formed on one or both sides so as to deform the holes on one or both sides as a function of a desired result, with deformation of the holes on one side only being capable of causing the bristles to take up an orientation that is different from the orientation taken up when the holes are deformed on both sides.

Because of the ease with which the bristles can be put into place on the support, the invention may make it possible to use a small number of different supports to make a large number of brushes or combs very quickly that receive tufts comprising bristles of different natures and/or diameters and/or lengths, and also a greater or smaller number of bristles per tuft.

The invention may provide increased flexibility in the manufacture of applicators.

The invention also provides for a method of manufacturing an applicator for applying a substance to hairs, in particular the eyelashes or eyebrows. The method may comprise making or providing a non-twisted support of elongate shape having through holes and secondary holes having an axis substantially perpendicular to the axis of the through holes. The method may also include inserting tufts of bristles in the through holes and inserting pegs in the secondary holes so as to retain each tuft of bristles in the corresponding through hole.

It is to be understood that both the foregoing description and the following description are exemplary, and are intended to provide further explanation of the invention as claimed.

The accompanying drawings are included to provide a further understanding of the invention and are incorporated in and constitute a part of this specification. The drawings illustrate optional embodiments of the invention and, together with the description, serve to explain certain principles.

In the drawings,

FIG. 1 is a diagrammatic axial view of a packaging and applicator device according to an embodiment of the invention;

FIG. 2 is a diagrammatic fragmentary axial section view showing holes having tufts of bristles therein;

FIG. 3 is a view of a tuft of bristles being placed in a through hole;

FIG. 4 shows a variant technique of placing a tuft of bristles in a through hole;

FIG. 5 is a view of a tuft of bristles after cropping the loops;

FIG. 6 is a view of a support being formed after the tufts of bristles have been inserted;

FIG. 7 is a diagrammatic cross-section of the support after forming on one side;

FIG. 8 is a view of the support of FIG. 7 after forming the support on two opposite sides;

FIGS. 9 and 10 are views showing the influence of hole shape on the way the bristles are disposed outside the support;

FIG. 11 is a cross-sectional view of a support having a secondary (or blind) hole and a fastener to be inserted therein for holding a tuft of bristles;

FIG. 12 is a diagrammatic and fragmentary perspective view of a support provided with side notches;

FIG. 13 is a fragmentary and diagrammatic view of a support having oppositely-directed tufts of bristles;

FIGS. 14 to 19 are views of different brush configurations;

FIGS. 20 and 21 are views of different dispositions of through holes in the support;

FIG. 22 is a view of through holes at different inclinations;

FIG. 23 is a view showing a support of polygonal cross-section, provided with crossing tufts of bristles;

FIGS. 24 and 25 are views showing brushes with supports of square section;

FIG. 26 is a view of a through hole that is not rectilinear;

Reference will now be made in detail to optional embodiments of the invention, examples of which are illustrated in the accompanying drawings. Wherever possible, the same reference numbers are used in the drawings and the description to refer to the same or like parts.

Figure 27:
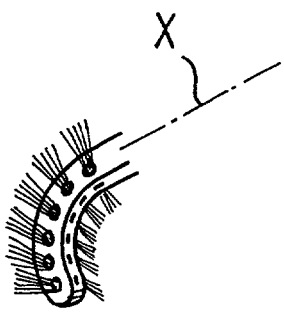
FIGS. 27 and 28 are fragmentary views of curved supports.

FIG. 1 shows a packaging and applicator device 1 according to an embodiment of the invention. The device 1 may comprise a receptacle 2 including a substance, such as a cosmetic or care product P, e.g., mascara for application to the eyelashes or the eyebrows.

A top portion of the receptacle 2 may be provided with a neck 3 secured to an assembly skirt 4 snap-fastened on the body of the receptacle 2.

The device 1 may have an applicator 10 at an end of a wand 11 having an axis X that is connected to a handle member 12. The handle member 12 may provide a closure cap for the receptacle 2.

Figure 31:
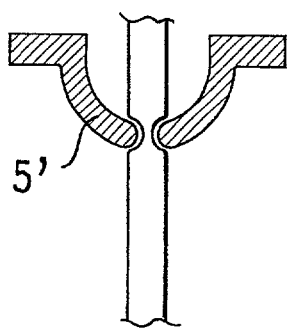
FIG. 31 is a view showing a portion of narrow section formed in a wand of an applicator.

A wiper member 5 may be provided, for example, in the body of the receptacle 2 for wiping the applicator 10 while it is leaving the receptacle. The wiper member 5 may include a block of open-celled foam, however, any kind of wiper could be used. In another embodiment, the wiping member could optionally include a flocked elastomer lip 5' as shown in FIG. 31.

The wand may optionally include a portion of narrow section making it possible when the applicator is in place in the receptacle to help avoid undue deformation of the wiper member.

Referring to FIG. 2, the applicator 10 may have a support 20 that is elongate along the axis X, and that has through holes 21 crossing it in a direction perpendicular to the axis X. Each through hole 21 may receive a tuft of bristles 22. The support 20 could have other orientations, e.g., it could be perpendicular to the axis X.

Axes of the through holes 21 may be substantially perpendicular to the longitudinal axis of the support 20.

The bristles 22 of a tuft may be inserted into the corresponding through hole 21 by means of an insertion tool T, as shown in FIG. 3.

To facilitate insertion, the bristles 22 of the tuft in question may be folded in half into a U-shape and the tool T may bear against the bottom of the U-shape to push the bristles 22 into the through hole 21.

The tool T may then be withdrawn, leaving the bristles 22 in place in the through hole 21, with the bristles forming loops 23 at an end of the through hole 21 opposite from an end through which the bristles 22 were inserted. Optionally, the loops can subsequently be cropped, as shown in FIG. 5.

It is also possible for the bristles not to be folded exactly in half, but to be folded, for example, at three-fourths of their length, as shown in FIG. 4.

To ensure that each tuft of bristles 22 is fixed in the corresponding through hole 21, the support 20 can be hot- or cold-formed, depending on the nature of the material from which it is made. To form the support 20, one or more appropriate punches (not shown for reasons of clarity in the drawing) may be used to apply pressure locally on one or both sides of the support 20 in register with each through hole 21, as represented by arrows in FIG. 6. The pressure applied locally to the support 20 perpendicularly to the axes of the holes has the result of causing the material on one side 24 of the support 20 to be plastically deformed as shown in FIG. 7, or on both sides 24 and 25 of the support 20, as shown in FIG. 8.

Deformation of the support 20 may reduce the cross-section of each through hole 21 such that the bristles 22 are clamped and prevented from moving therein. The cross-section of each hole 21 may be non-constant as a result of deformation of the support 20.

Depending on the shape of the hole in which a tuft of bristles is engaged, it is possible to obtain bristles which extend from the support at an angle i that is open to a greater or lesser extent, as shown in FIGS. 9 and 10.

FIG. 9 shows a support 30 provided with a circularly cylindrical hole 31 in the vicinity of at least one of its ends.

In the embodiment of FIG. 9, it may be observed that the bristles remain somewhat bunched together outside the support 30 and form a bundle that diverges very little.

FIG. 10 shows a support 40 provided with a hole 41 that opens to the outside of the support 40 via a countersink 42. The presence of the countersink 42 enables the bristles to spread out so as to flare outside the support 40 at an angle i that is greater than the preceding angle i. By selecting the shape for each hole in the support, it is possible to obtain different bristle configurations, e.g., as a function of the desired makeup effect and/or the nature of the substance to be applied to the eyelashes or the eyebrows.

In order to fix the tufts of bristles to the support, it is also possible to provide secondary holes (also referred to as blind holes) for receiving a fastener. An axis of the secondary holes may be substantially perpendicular to axes of the through holes that receive the tufts. FIG. 11 is a view showing a support 50 having vertical through holes 51 for receiving tufts of bristles.

Horizontal secondary or blind holes 52 are made in the support, each opening out at one end in a corresponding through hole 51. Because of the blind hole 52, the corresponding through hole 51 is not of constant cross-section. The cross-section of through hole 51 is substantially the same above and below the blind hole 52 and is different at the level of the blind hole 52. A fastener 53 (e.g., peg) may be forced into each secondary or blind hole 52 to lock the bristles in place in the through hole 51.

FIG. 12 shows a support 55 having notches 56 on its side faces for the purpose of providing reserves of substance and exerting additional combing action on the eyelashes.

As shown in FIG. 13, the tufts of bristles can be implanted in the support by being inserted in the through holes from opposite sides of the support. In this embodiment, a support 60 has a plurality of holes 61, with the holes receiving tufts of bristles that are inserted alternately from above and from below.

FIGS. 14 to 19 show various applicators according to embodiments of the invention.

FIG. 14 is on a scale that is larger than the scale of the applicator 10 shown in FIG. 1. It can be seen that the applicator 10 may comprise not only the support 20 but also front and rear portions 28 and 29, which are shaped to make it easier to pass through the wiper member 5. The spacing between the through holes in which the tufts of bristles 22 are received may be selected in such a manner that the ends of the tufts are substantially touching. Traces 26 (e.g., indentations) caused by the forming process can also be seen in FIG. 14.

In the embodiment of FIG. 14, when the applicator 10 is viewed from the side, ends of the bristles 22 may be substantially in alignment on a straight line passing substantially through the bottom edges 28a and 29a of the front and rear portions 28 and 29.

The bristles can be machined or ground after they have been implanted in the support so as to obtain various determined profiles, as shown in FIGS. 15 to 17.

FIG. 15 shows an applicator 70 having a support 20 with front and rear portions 28 and 29 like the above-described applicator 10, and having tufts of bristles that are machined so that when the applicator 70 is seen from the side, the ends of the bristles define a line 71 that is outwardly concave, with its curvature being adapted, for example, to match the outline of an eyelid.

FIG. 16 shows an applicator 80 that differs from the above-described applicators 10 and 70 by the fact that the bristles are machined after they have been installed in the support 20 so that when the applicator 80 is observed from the side, the ends of the bristles lie on a saw-tooth line 81 so as to produce an additional combing effect on the eyelashes. To illustrate the fact that the loops 23 are optionally cropped (e.g., due to the way the tufts of bristles are put into place in the support), FIG. 16 shows an applicator in which the loops are not cropped. The loops 23 can be used to provide reserves of substance.

FIG. 17 shows an applicator 90 comprising a support 91 including a portion of a wand, optionally of flattened section, having a leading end 92 tapered so as to make it easier to insert into a receptacle containing the substance. Tufts of bristles may be implanted in the support 91. The bristles may be machined on one side of the support 91 so that ends of the bristles lie on a line 93 that is outwardly-convex when the applicator 90 is observed from the side. On the opposite side of the support 91, the loops may be partially cropped so as to form tufts of bristles. As shown, the tufts can be machined so that their ends, when the applicator 90 is observed from the side, are situated on a line 94 that is slightly concave towards the outside.

Naturally, applicators could be given other profiles without going beyond the ambit of the present invention, and depending on the desired makeup effects.

The support can include portions in relief and/or roughnesses and/or teeth for producing additional makeup effects, for facilitating the combing and/or smoothing of the substance on the eyelashes so as to lengthen them and/or curve them and/or constitute reserves of substance making it easier to apply the substance by increasing the length of time during which the applicator can be used. For example, FIG. 18 shows an applicator 100 comprising a support 101 having one side in the shape of saw-teeth 102. At the bottom of each of the notches formed between the teeth 102 of the support 101 there opens out a through hole including a tuft of bristles. The tuft can optionally have a flared configuration because of the V-shape of the notch. The holes in which the tufts of bristles are inserted may be of constant section at their ends remote from the saw-teeth 102, thereby forming bundles 103 of bristles that diverge little.

FIG. 19 shows an applicator 110 including a support 111 that has holes in which tufts of bristles are fixed like the embodiments described above. The tufts of bristles project from one side of the support 111. On the opposite side, the applicator may have one or more rows of teeth 112 formed integrally with the support 111 and designed to comb the eyelashes, for example. By way of example, the support 111 can have two rows of teeth 112, that are offset in such a manner that the teeth 112 are disposed in a staggered configuration with non-touching bases, and with the holes in which the tufts of bristles are implanted being, for example, disposed on a line that extends between the two rows of teeth 112.

The tufts of bristles can be implanted in holes that are optionally in alignment, and the support can have one or more rows of holes on axes that are optionally parallel.

By way of example, FIG. 20 shows a support 120 that is generally spatula-shaped, being elongate along a longitudinal axis and having a succession of holes 121 passing through its thickness. The through holes 121 are shown disposed in a staggered configuration in alternation on either side of a boundary surface S which, in this case, is a midplane of symmetry of the support. By placing the holes 121 in a staggered configuration and by appropriately machining their ends, it is possible to form V-shaped notches that are between the bristles implanted in two consecutive holes, and that overlap when the applicator is seen from the side. Such V-shaped notches may facilitate spreading of the substance on the eyelashes.

The applicator can also have two or more parallel rows of holes that are not offset, as shown in FIG. 21. For example, a support 130 comprises two rows of holes 131 and 132 that are not offset in the longitudinal direction.

FIG. 22 shows a support 140 having groups of holes passing therethrough, each group comprising two holes 141 and 142 on axes that are not parallel, with both holes opening out on one side of the support 140 through a common orifice 143. The holes 141 and 142 enable respective tufts of bristles to be implanted so that the bristles form a V-shape extending out from the support when the applicator is viewed from a side.

In a variant that is not shown, the support may have through holes analogous to the holes 141 and 142, but that do not open out through common orifices.

In the examples described above, the axes of the holes receiving the tufts of bristles are parallel to the plane of FIGS. 14 to 19, but the holes could have different orientations.

The support receiving the tufts of bristles can be of arbitrary cross-section, e.g., circular, elliptical, polygonal, or other, and the section can be constant or varying in the longitudinal direction. By way of example, FIG. 23 shows an applicator 150 constituting a brush comprising an elongate support 151 of triangular cross-section defining three faces 152 disposed like the sides of an isosceles triangle. The support 151 may have through holes 153 passing therethrough that cross in the center of the support 151 and that extend along the heights of the above-mentioned isosceles triangle. The holes 153 may open out on the faces 152 via countersinks 154. Tufts of bristles 155 may be inserted in the holes 153 and the bristles may be held in position completely or partially by the bristles crossing in the central region of the support 151.

As shown in FIGS. 24 and 25, it is possible to make the support which receives the tufts of bristles so as to have a cross-section that is other than triangular, for example, the support can have a square cross-section.

The holes in which the bristles are implanted can optionally intersect, and when the holes do intersect, the crossing of the bristles can optionally contribute to holding them in place.

The loops provided for putting the tufts of bristles into place and extending out from the support can optionally be cropped. By way of example, FIG. 24 shows loops that have been retained on two faces of the applicator, while FIG. 25 shows loops that have been cropped so as to obtain an applicator having substantially identical tufts of bristles on all four faces.

It is possible to make holes through the support that are not rectilinear, such holes having portions extending along axes Y and Z that are at a non-zero acute angle to each other, as shown in FIG. 26. In other words, as shown in FIG. 26, the hole may have a centerline that is not substantially straight between ends of the hole.

Figure 28:
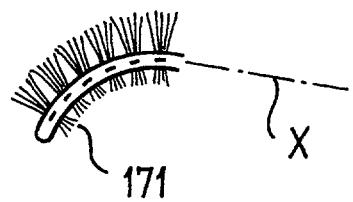

The support in which the tufts of bristles are implanted can be curved in a plane perpendicular to the axes of the holes, as shown in FIG. 27, or the support can be curved about an axis that is perpendicular to axes of the holes, as shown in FIG. 28.

In FIG. 28, the bristles extending from the outwardly-convex face 171 of the applicator are at an angle relative to the axis X that increases with increasing distance from a wand of the applicator.

The support in which the bristles are implanted can be made as a single piece by injection-molding a thermoplastic material or a metal alloy or by stamping or by machining.

Figure 29:
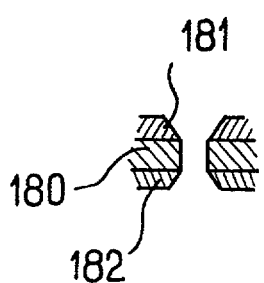
FIG. 29 is a fragmentary and diagrammatic cross-section showing a composite support.

The support can also be of composite structure, as shown in FIG. 29, having a core 180 sandwiched between top and bottom portions 181, 182 optionally made of materials that are different from that of the core. For example, the core 180 can be made of a ductile metal, while the top and bottom portions 181 and 182 are made of a plastics material.

Figure 30:
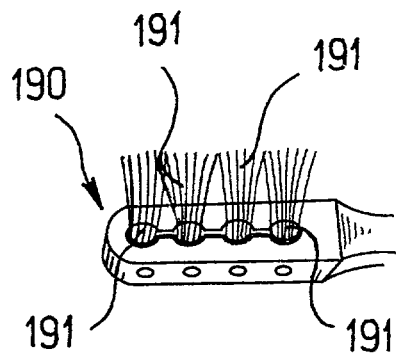
FIG. 30 is a view of a support with intercommunicating holes.

The holes can be made by molding the support or by piercing it. The holes can also intercommunicate with one another, as shown in FIG. 30. In the embodiment of FIG. 30, an applicator 190 comprises a series of holes 191 that communicate with one another via an open portion of the support. The holes 191 may be formed between two undulating edges of an open central region of the support.

Naturally, the invention is not limited to the embodiments described above. For example, it is possible to make the support in yet further shapes.

The tufts of bristles can be secured to supports by means other than deforming the support, with or without additional elements, e.g., by locally melting material or by using an adhesive.

The holes can be circular, polygonal, or other cross-section, at some position along their length.

The bristles can receive treatment other than the above-mentioned machining, such as carding, local melting, or having substance injected thereover.

Figure 32:
FIG. 32 is a view of an end of a bristle after carding.
Figure 33:
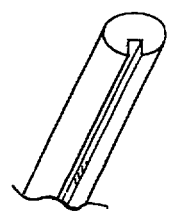
FIG. 33 is a view of an end of a bristle having a groove.

By way of example, FIG. 32 shows the end of a bristle that has been subjected to carding. It is also possible to use bristles that have grooves, as shown in FIG. 33.

In a variant that is not shown, the holes receiving the tufts of bristles can be eccentric relative to the support.

It will be apparent to those skilled in the art that various modifications and variations can be made to the structure and methodology of the present invention. Thus, it should be understood that the invention is not limited to the embodiments and examples discussed in the specification. Rather, the present invention is intended to cover modifications and variations.

What is claimed is:

1. A device for applying a product to hair, the device comprising:
    an applicator comprising:
        a support not including a twisted wire;
        at least one through hole extending through the support, in a direction transverse to a longitudinal axis of the support, the at least one through hole having a non-constant cross-section along the direction; and
        a tuft of bristles held in the at least one through hole, the tuft of bristles being configured to apply the product to hair, and
    a receptacle containing a hair product,
    wherein the applicator is configured to apply the product to eyelashes or eyebrows,
    wherein the at least one through hole comprises a plurality of through holes, each through hole receiving a respective tuft of bristles.

2. The device of claim 1, wherein the at least one through hole comprises two ends, each end being on an external face of the support.

3. The device of claim 1, wherein the support is substantially straight along at least a portion including the at least one through hole.

4. The device of claim 1, wherein the at least one through hole is deformed by plastically deforming the support after the tuft of bristles is inserted in the at least one hole, the deformation of the at least one through hole holding the tuft of bristles therein.

5. The device of claim 4, wherein a portion of the at least one through hole has a reduced cross-section resulting from the deformation, the portion of reduced cross-section holding the bristles in the at least one through hole.

6. The device of claim 1,
    wherein the at least one through hole is deformed by one of forming, seaming, heat-sealing, and stamping of the support.

7. The device of claim 6, wherein the at least one through hole is deformed by forming of the support.

8. The device of claim 1, further comprising a fastener holding the tuft of bristles in the at least one through hole.

9. The device of claim 8, wherein the fastener extends in a direction substantially perpendicular to an axis of the tuft of bristles.

10. The device of claim 8, wherein the applicator further comprises a secondary hole associated with the at least one through hole, the secondary hole intersecting with the through hole.

11. The device of claim 10, wherein the fastener is at least partially in the secondary hole.

12. The device of claim 11, wherein an axis of the secondary hole is substantially perpendicular to an axis of the at least one through hole.

13. The device of claim 8, wherein the fastener is a peg.

14. The device of claim 1, wherein a cross-section of the at least one through hole is one of square, oblong, and non-circular at some position between ends of the at least one through hole.

15. The device of claim 1, wherein the at least one through hole comprises a countersink adjacent to an end thereof.

16. The device of claim 1, wherein the plurality of through holes comprises at least one row of through holes.

17. The device of claim 16, wherein the at least one row of through holes is disposed in a staggered configuration.

18. The device of claim 1, wherein at least some of the plurality of through holes intercommunicate with one another.

19. The device of claim 1, wherein the plurality of through holes includes a first through hole having a first axis and a second through hole having a second axis, the first and second axes being not parallel to one another.

20. The device of claim 19, wherein the tufts of bristles in the first and second through holes form a V-shape extending from the support when the applicator is viewed from a side.

21. The device of claim 19, wherein the first and second axes cross one another when the axes are projected in a plane.

22. The device of claim 1, wherein the plurality of through holes comprises a first through hole and a second through hole, the first and second through holes intersecting one another.

23. The device of claim 22, wherein the tuft of bristles in the first through hole contacts the tuft of bristles in the second through hole.

24. The device of claim 22, wherein the first and second through holes open onto an external face of the support via a common orifice.

25. The device of claim 1, wherein the support is elongate in shape and of polygonal cross-section.

26. The device of claim 25, wherein the support has a triangular cross-section.

27. The device of claim 1, wherein the support is elongate in shape and comprises at least one of a portion having teeth, a portion having notches, a portion in relief, and a portion having roughnesses, the portion being configured to at least one of enable hairs to be combed, enable hairs to be smoothed, and provide reserves of product.

28. The device of claim 27, wherein the support comprises at least one of the portion having notches, the portion in relief, and the portion having roughnesses, the portion extending transversely to a longitudinal axis of the support.

29. The device of claim 1, wherein the support is a single piece.

30. The device of claim 1, further comprising a wand on the support.

31. The device of claim 30, wherein the wand is not hollow.

32. The device of claim 30, wherein the wand and the support are a single piece of unitary construction.

33. The device of claim 1, wherein the support is a composite structure.

34. The device of claim 33, wherein the support comprises a core sandwiched between a top portion of the support and a bottom portion of the support, the top and bottom portions being made of materials different than the core.

35. The device of claim 1, wherein at least some of the bristles comprise at least one of grooves, folds, forks, and rounded heads.

36. The device of claim 1, wherein at least some of the bristles are flat.

37. The device of claim 1, wherein at least some of the bristles are cropped at an end of the at least one through hole.

38. The device of claim 1, wherein the bristles project from first and second ends of the at least one through hole to respective heights that are one of substantially identical to one another and different from one another.

39. The device of claim 1, wherein the tufts of bristles form a brush having a profile of at least one of concave, convex, and saw-tooth.

40. The device of claim 1, wherein the tuft of bristles comprises bristles having at least one of different diameters and different cross-sections.

41. The device of claim 1, wherein the plurality of through holes comprises a first through hole and a second through hole, and wherein the tuft of bristles corresponding to the first through hole comprises bristles having one of a diameter and cross-section different from the tuft of bristles corresponding to the second through hole.

42. The device of claim 1, further comprising a wiper member configured to enable wiping of the applicator when the applicator is removed from the receptacle.

43. The device of claim 42, wherein the receptacle is configured to removably receive the applicator.

44. The device of claim 43, wherein the applicator comprises a wand having first and second ends, the first end of the wand being on the support.

45. The device of claim 44, wherein the wand comprises a portion of reduced cross-section at a position substantially level with the wiper member when the applicator is in the receptacle.

46. The device of claim 44, further comprising a handle member on the second end of the wand, the handle member being configured to provide a cap for closing an opening of the receptacle.

47. The device of claim 44, wherein the support is made of a material that is more flexible than a material used to make the wand.

48. The device of claim 42, wherein the wiper member includes at least one of a foam and an elastomer.

49. A method of applying a product to eyelashes or eyebrows, the method comprising:
providing the device of claim 42, the receptacle containing a supply of the product for eyelashes or eyebrows;
inserting the applicator in the receptacle;
loading the applicator with the product;
removing the applicator from the receptacle;
wiping the applicator on the wiping member when removing the applicator from the receptacle; and
applying the product to the eyelashes or the eyebrows by moving the applicator along the eyelashes or the eyebrows.

50. The device of claim 1, wherein at least some of the bristles are made out of the same material as the support.

51. The device of claim 1, wherein the bristles are made by extruding a soft elastomer material.

52. The device of claim 1, wherein the bristles are made of a material comprising a gliding agent to facilitate gliding of the bristles along hair, the gliding agent being chosen from graphite, polytetrafluoroethylene and derivatives thereof, silicones and derivatives thereof, and molybdenum disulfide.

53. The device of claim 1, wherein the support is made of at least one material chosen from polyethylene, polypropylene, polystyrene, polycarbonate, polyamide, polyacetate, polyurethane, polyester, and thermoplastic elastomers.

54. The device of claim 1, wherein the tuft of bristles comprises from about 2 to about 250 bristles.

55. The device of claim 54, wherein the tuft of bristles comprises, from about 4 to about 100 bristles.

56. The device of claim 55, wherein the tuft of bristles comprises from about 5 to about 50 bristles.

57. A method of applying a product to eyelashes or eyebrows, the method comprising:
providing the device of claim 1;
loading the applicator with the product; and
applying the product to the eyelashes or the eyebrows by moving the applicator along the eyelashes or the eyebrows.

58. The method of claim 57, wherein the product is mascara, and wherein the applying comprises applying the mascara to eyelashes by moving the applicator along the eyelashes.

59. The method of claim 57, wherein the loading comprises placing the applicator at least partially in the receptacle and contacting the applicator with the product in the receptacle.

60. The device of claim 1, wherein:
the plurality of through holes comprises a first through hole and a second through hole,
the tuft of bristles comprises a first tuft of bristles and a second tuft of bristles, and
the first through hole receives the first tuft of bristles, and the second throught hole receives the second tuft of bristles.

61. A device for applying a product to hair, the device comprising:
an applicator comprising:
a support not including a twisted wire;
a first through hole and a second through hole, each extending through the support, at least one of the first and second through holes having a non-constant cross-section; and
a first tuft of bristles and a second tuft of bristles held in the first through hole and the second through hole, respectively, the first and second tufts of bristles being configured to apply the product to hair, and a receptacle containing a hair product,
wherein the applicator is configured to apply the product to eyelashes or eyebrows,
wherein the centerline of the at least one of the first and second through holes between ends of the at least one of the first and second through holes is not substantially straight.

62. The device of claim 61, wherein the applicator further comprises a third tuft of bristles and a third through hole receiving the third tuft of bristles.

63. A device for applying a product to hair, the device comprising:
an applicator comprising:
a support not including a twisted wire;
a first through hole and a second through hole, each extending through the support, at least one of the first and second through holes having a non-constant cross-section; and
a first tuft of bristles and a second tuft of bristles held in the first through hole and the second through hole, respectively, the first and second tufts of bristles being configured to apply the product to hair, and
a receptacle containing a hair product,
wherein the applicator is configured to apply the product to eyelashes or eyebrows,
wherein the support has a flat shape.

64. The device of claim 63, wherein the applicator further comprises a third tuft of bristles and a third through hole receiving the third tuft of bristles.

65. A device for applying a product to hair, the device comprising:
an applicator comprising:
a support not including a twisted wire;
a first through hole and a second through hole, each extending through the support, at least one of the first and second through holes having a non-constant cross-section; and
a first tuft of bristles and a second tuft of bristles held in the first through hole and the second through hole, respectively, the first and second tufts of bristles being configured to apply the product to hair, and
a receptacle containing a hair product,
wherein the applicator is configured to apply the product to eyelashes or eyebrows,
wherein at least some of the bristles form loops adjacent to an end of at least one of the first and second through holes.

66. The device of claim 65, wherein the applicator further comprises a third tuft of bristles and a third through hole receiving the third tuft of bristles.

67. A method of manufacturing an applicator for applying a product to hair, the method comprising:
providing a support not including a twisted wire and formed of a single piece of unitary construction, the support comprising a first through hole and a second through hole, each extending through the support;
inserting a first tuft of bristles exclusively in the first through hole;
inserting a second tuft of bristles that are distinct from the first tuft of bristles exclusively in the second through hole; and
fixing the first and second tufts of bristles in the first and second through holes, respectively, so as to retain the first and second tufts of bristles therein,
wherein fixing the first and second tufts of bristles comprises at least one of deforming at least one of the first and second through holes and interference-fitting of the first and second tufts of bristles into the first and second through holes, and
wherein the applicator manufactured according to the method is configured to apply the product to eyelashes or eyebrows.

68. The method of claim 67, wherein the fixing comprises deforming each of the through holes so as to retain the tuft of bristles therein.

69. The method of claim 68, wherein the deforming of each of the through holes comprises deforming the support on at least one side of each through hole.

70. The method of claim 69, wherein the deforming of each of the through holes comprises deforming the support on opposing sides of each through hole.

71. The method of claim 69, wherein the deforming of the support comprises applying a pressure to the support on at least one side of each through hole in a direction substantially perpendicular to an axis of the through hole.

72. An applicator manufactured according to the method of claim 68.

73. The method of claim 67, wherein the inserting of the tuft of bristles comprises inserting the tuft of bristles so that the bristles extend from an external face of the support at first and second ends of the through hole.

74. The method of claim 67, further comprising folding each tuft of bristles into a U-shape prior to inserting the tuft of bristles in the corresponding through hole, each of the bristles having a pair of free ends and a looped portion.

75. The method of claim 74, wherein the folding comprises folding the bristles in a location other than a middle thereof.

76. The method of claim 74, further comprising cropping the looped portion to provide an additional pair of free ends.

77. The method of claim 74, further comprising machining at least one of the free ends and the looped portion of the bristles.

78. The method of claim 67, further comprising shearing the bristles so as to give them a particular overall shape.

79. The method of claim 67, further comprising carding ends of the bristles so as to burst the ends.

80. The method of claim 67, further comprising cutting the tufts of bristles to a desired length prior to inserting the tufts of bristles in the through holes of the support, and not again cutting the tufts of bristles after inserting the tufts of bristles in the through holes of the support.

81. An applicator manufactured according to the method of claim 67.

82. The method of claim 67, wherein the support comprises a third through hole, and wherein the method further comprises inserting a third tuft of bristles in the third through hole.

83. A method of manufacturing an applicator for applying a product to hair, the method comprising:
providing a support not including a twisted wire and comprising a plurality of through holes extending through the support;
inserting a respective tuft of bristles in each of the through holes; and
fixing the respective tuft of bristles in each of the through holes so as to retain the tuft of bristles therein,
wherein the applicator manufactured according to the method is configured to apply the product to eyelashes or eyebrows, and
wherein the support comprises a plurality of secondary holes, each associated with each of the through holes, each of the secondary holes intersecting with each of the through holes, and wherein the fixing comprises inserting a fastener each of the secondary holes so as to retain the respective tuft of bristles in each through hole.

84. The method of claim 83, wherein an axis of each of the secondary holes is substantially perpendicular to an axis of each of the through holes, and wherein the fixing comprises inserting a peg in each of the secondary holes.

85. An applicator manufactured according to the method of claim 83.

86. A method of manufacturing an applicator for applying a product to hair, the method comprising:
providing a support comprising a first through hole and a second through hole, each extending through the support;
inserting a first tuft of bristles and a second tuft of bristles exclusively in the first and second through holes respectively;
fixing the first and second tufts of bristles therein; and
coupling a wand to the support by at least one of heat-sealing and deforming of the wand,
wherein the first tuft bristles and the second tufts of bristles are distinct from one another.

87. The method of claim 86, wherein the support comprises a third through hole, and wherein the method further comprises inserting a third tuft of bristles in the third through hole.

88. A device for packaging and applying a product to hair, the device comprising:
an applicator comprising:
a support not including a twisted wire and formed of a single piece of unitary construction;
a first through hole and a second through hole, each extending through the support, at least one of the first and second through holes having first and second ends on external faces of the applicator; and
a first tuft of bristles and a second tuft of bristles held in the first and second tufts of bristles being configured to apply the product to the hair, and
a receptacle for containing a supply of product,
wherein the applicator is configured to apply the product to eyelashes or eyebrows.

89. The device of claim 88, wherein the support is substantially straight along at least a portion including at least one of the first and second through holes.

90. The device of claim 88, wherein the first through hole is deformed by plastically deforming the support after the first tuft of bristles is inserted in the second through hole, the deformation of the first through hole holding the first tuft of bristles therein.

91. The device of claim 90, wherein a portion of the first through hole has a reduced cross-section resulting from the deformation, the portion of reduced cross-section holding the bristles in the first through hole.

92. The device of claim 88, further comprising a fastener holding the first tuft of bristles in the first through hole.

93. The device of claim 92, wherein the fastener extends in a direction substantially perpendicular to an axis of the first tuft of bristles.

94. The device of claim 92, wherein the applicator further comprises a secondary hole associated with the first through hole, the secondary hole intersecting with the first through hole.

95. The device of claim 94, wherein the fastener is at least partially in the secondary hole.

96. The device of claim 95, wherein an axis of the secondary hole is substantially perpendicular to an axis of the first through hole.

97. The device of claim 92, wherein the fastener is a peg.

98. The device of claim 88, wherein the first and second through holes intersect one another.

99. The device of claim 98, wherein the tuft of bristles in the first through hole contacts the tuft of bristles in the second through hole.

100. The device of claim 98, wherein the first and second through holes open onto an external face of the support via a common orifice.

101. The device of claim 88, wherein a centerline of the first through hole between the first and second ends of the first through hole is not substantially straight.

102. The device of claim 88, wherein at least some of the bristles project from the first end and at least some of the bristles project from the second end of at least one of the first and second through holes.

103. The device of claim 88, further comprising a wiper member configured to enable wiping of the applicator.

104. The device of claim 88, further comprising a hair product contained in the receptacle.

105. A method of applying a product to eyelashes or eyebrows, the method comprising:
providing the device of claim 104;
loading the applicator with the product; and
applying the product to the eyelashes or the eyebrows by moving the applicator along the eyelashes or the eyebrows.

106. The device of claim 88, wherein the applicator further comprises a third tuft of bristles and a third through hole receiving the third tuft of bristles.

107. An applicator for applying a product to hair, the applicator comprising:
a support not including a twisted wire;
a first through hole having a first axis and a second through hole having a second axis, each of the first and second through holes extending through the support, at least one of the first and second through holes having first and second ends on external faces of the support; and
a first tuft of bristles and a second tuft bristles held in the first and second through holes, respectively, the first and second tufts of bristles being configured to apply the product to the hair,
wherein the applicator is configured to apply the product to eyelashes or eyebrows, and
wherein the first and second axes are not parallel to one another.

108. The applicator of claim 107, wherein the first and second tufts of bristles in the first and second through holes form a V-shape extending from the support when the applicator is viewed from a side.

109. The applicator of claim 107, wherein the first and second axes cross one another when the axes are projected in a plane.

110. The device of claim 107, wherein the applicator further comprises a third tuft of bristles and a third through hole receiving the third tuft of bristles.

111. A device for applying a product to hair, the device comprising: an applicator comprising:
a support not including a twisted wire and being non-hollow; a first through hole and a second through hole, each extending through the support; and
a first tuft of bristles and a second tuft of bristles held in the first through hole and the second through hole, respectively, the first and second tufts of bristles being configured to apply the product to the hair, and a receptacle for containing a supply of product, wherein the applicator is configured to apply the product to eyelashes or eyebrows.

112. The device of claim 111, wherein the applicator comprises a wand on an end of the support, the wand not being hollow.

113. The device of claim 112, further comprising a wiper member configured to enable wiping of the applicator.

114. A method of applying a product to eyelashes or eyebrows, the method comprising:

providing the device of claim 112;

loading the applicator with the product; and applying the product to the eyelashes or the eyebrows by moving the applicator along the eyelashes or the eyebrows.

115. The device of claim 111, further comprising a wiper member configured to enable wiping of the applicator.

116. A method of applying a product to eyelashes or eyebrows, the method comprising:

providing the device of claim 111;

loading the applicator with the product; and applying the product to the eyelashes or the eyebrows by moving the applicator along the eyelashes or the eyebrows.

117. The device of claim 111, wherein the applicator further comprises a third tuft of bristles and a third through hole receiving the third tuft of bristles.

118. The device of claim 111, wherein at least one of the first and second through holes has a non-constant cross-section.

119. A method of manufacturing an applicator for applying a product to hair, the method comprising:

providing a support not including a twisted wire, the support comprising a plurality of through holes extending through the support and a plurality of secondary holes corresponding to the through holes, each secondary hole having an axis substantially perpendicular to the corresponding through hole;

inserting a tuft bristles in each of the through holes; and inserting a fastener in each of the secondary holes so as to retain the tuft of bristles in the corresponding through hole, wherein the applicator manufactured according to the method is configured to apply the product to the eyelashes or eyebrows.

120. The method of claim 119, wherein the inserting of the fastener comprises inserting a peg in the secondary holes.

121. A device comprising:

an applicator configured to apply a product to eyelashes or eyebrows, the applicator comprising:

a support not including a twisted wire, the support having a longitudinal axis, the support further comprising a first face extending along said longitudinal axis, said first face having a first opening having a first axis, said second face having a second opening having a second axis, the first and second axis forming an angle therebetween when the applicator is viewed along its longitudinal axis; and at least a tuft of bristles having a first end extending outside the support from said first opening and a second end extending outside the support from the second opening.

122. The device of claim 121, further comprising a receptacle containing a hair product.

* * * * *

UNITED STATES PATENT AND TRADEMARK OFFICE
CERTIFICATE OF CORRECTION

PATENT NO. : 7,156,105 B2
APPLICATION NO. : 09/860601
DATED : January 2, 2007
INVENTOR(S) : Jean-Louis H. Gueret It is certified that error appears in the above-identified patent and that said Letters Patent is hereby corrected as shown below:

Col. 13, lines 47-48, "support, in" should read --support in--.

Col. 15, line 8, "a" should read --the--.

Col. 16, line 54, "throught" should read -- through--.

Col. 19, line 2, "fastener each" should read --fastener in each--.

Col. 19, line 19, "bristles therein" should read --bristles in the first and second through holes so as to retain the first and second tufts of bristles therein--.

Col. 19, line 22, "first tuft" should read --first tuft of--, and "second tufts" should read --second tuft--.

Signed and Sealed this

Thirteenth Day of March, 2007

JON W. DUDAS
*Director of the United States Patent and Trademark Office*